(12) United States Patent  
Cantwell

(10) Patent No.: US 9,262,726 B2  
(45) Date of Patent: Feb. 16, 2016

(54) USING RADIAL BASIS FUNCTION NETWORKS AND HYPER-CUBES FOR EXCURSION CLASSIFICATION IN SEMI-CONDUCTOR PROCESSING EQUIPMENT

(71) Applicant: Applied Materials, Inc., Santa Clara, CA (US)

(72) Inventor: Dermot Cantwell, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 212 days.

(21) Appl. No.: 14/151,295

(22) Filed: Jan. 9, 2014

(65) Prior Publication Data

US 2014/0201117 A1    Jul. 17, 2014

Related U.S. Application Data

(60) Provisional application No. 61/753,796, filed on Jan. 17, 2013.

(51) Int. Cl.
*G06F 15/18* (2006.01)
*G06N 99/00* (2010.01)

(52) U.S. Cl.
CPC .................... *G06N 99/005* (2013.01)

(58) Field of Classification Search
None
See application file for complete search history.

(56) References Cited

U.S. PATENT DOCUMENTS

| 5,717,832 A | 2/1998 | Steimle et al. |
| 2009/0043547 A1 | 2/2009 | Kirby et al. |
| 2009/0136095 A1 | 5/2009 | Marcon et al. |
| 2012/0101978 A1 | 4/2012 | Wilkinson et al. |

FOREIGN PATENT DOCUMENTS

WO    2011148371 A1    1/2011

OTHER PUBLICATIONS

Broomhead,D.S. et al. (1988). "Radial basis functions, multi-variable functional interpolation and adaptive networks." No. RSRE-MEMO-4148. Royal Signals and Radar Establishment Malvern (United Kingdom), 1988. 39 pages.*
International Search Report and Written Opinion dated Apr. 29, 2014 for PCT/US2014/011528.

* cited by examiner

*Primary Examiner* — Jeffrey A Gaffin
*Assistant Examiner* — Benjamin Buss
(74) *Attorney, Agent, or Firm* — Lowenstein Sandler LLP

(57) ABSTRACT

A method and system for analysis of data, including creating a first node, determining a first hyper-cube for the first node, determining whether a sample resides within the first hyper-cube. If the sample does not reside within the first hyper-cube, the method includes determining whether the sample resides within a first hyper-sphere, wherein the first hyper-sphere has a radius equal to a diagonal of the first hyper-cube.

20 Claims, 18 Drawing Sheets

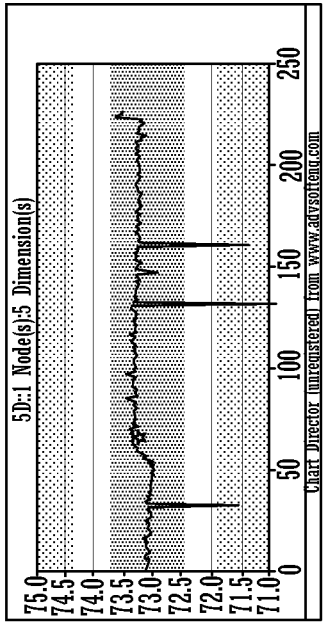
FIG. 14A
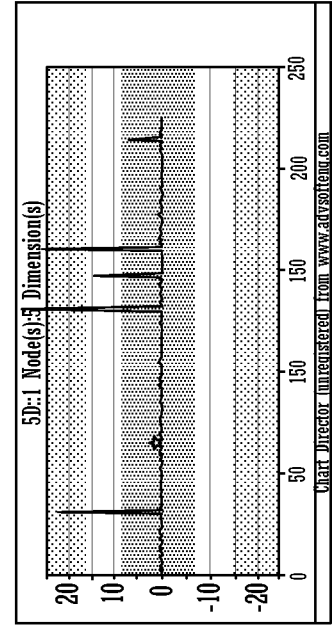
FIG. 14B
FIG. 14C
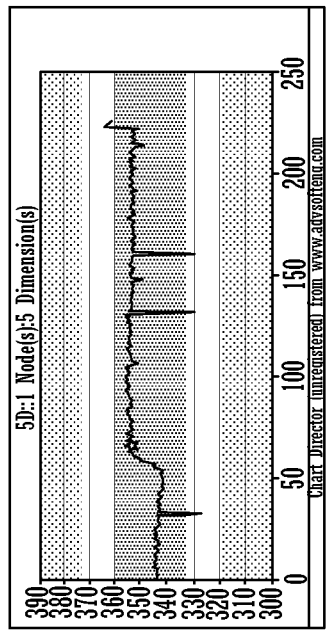
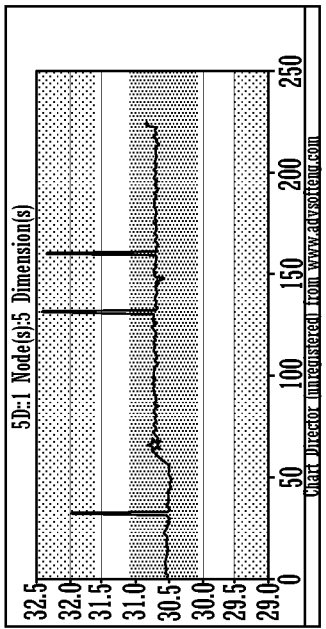
FIG. 14D
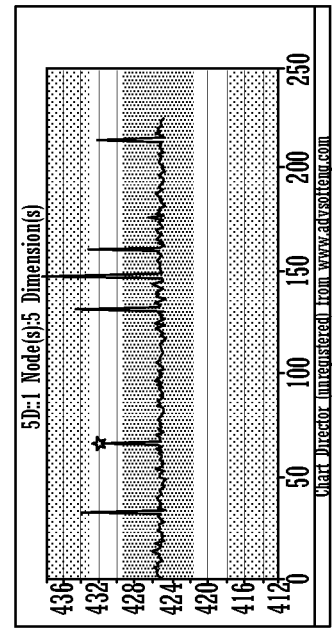
FIG. 14E

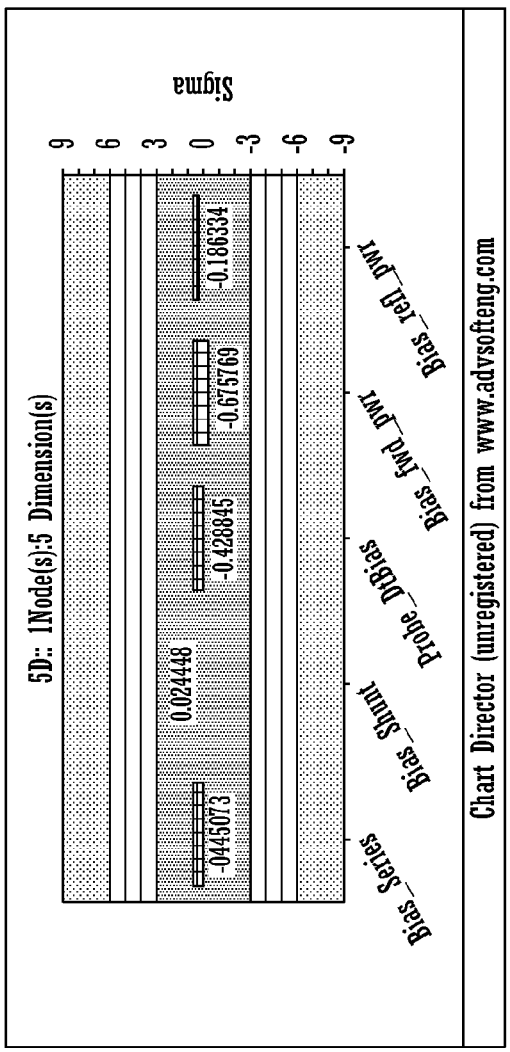
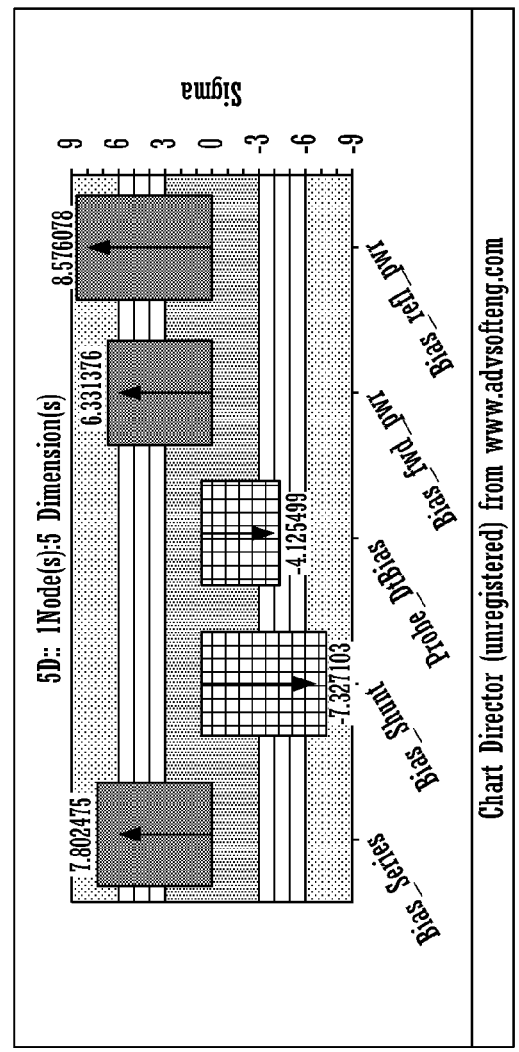
FIG. 15A
FIG. 15B

USING RADIAL BASIS FUNCTION NETWORKS AND HYPER-CUBES FOR EXCURSION CLASSIFICATION IN SEMI-CONDUCTOR PROCESSING EQUIPMENT

TECHNICAL FIELD

This application is related to and claims priority of U.S. Provisional Patent Application No. 61/753,796 filed Jan. 17, 2013, the contents of which are hereby incorporated by reference.

TECHNICAL FIELD

The present disclosure relates to artificial neural networks, and, more particularly, to radial basis function networks for analyzing a system.

BACKGROUND OF THE INVENTION

Artificial neural networks may be used to analyze operation in a system based on known values of the system. For example, a user may be interested in analyzing sensor data, such as sensor data from semi-conductor processing equipment. A Radial Basis Function (RBF) network is an artificial neural network that uses radial basis functions as activation functions. In a typical RBF network, an RBF node or neuron is responsible for determining the activation value of the node, where each node has multiple inputs and one output. RBF networks typically can only differentiate between normal and abnormal values. Errors in RBF network analysis tend to be false negatives, and erroneous results tend to increase with increasing numbers of dimensions (e.g., numbers of sensors).

BRIEF DESCRIPTION OF THE DRAWINGS

The present disclosure is illustrated by way of example, and not by way of limitation, in the figures of the accompanying drawings.

FIGS. 14A, 14B, 14C, 14D, and 14E illustrate exemplary sensor data.

FIGS. 15A and 15B illustrate exemplary sensor data.

DETAILED DESCRIPTION

Embodiments of the present invention are directed to a method and system for RBF network and hyper-cube analysis of data. For example, data samples may be sensor data from semi-conductor processing equipment. In one embodiment, the method and system can detect whether samples indicate "normal" versus "abnormal" operation in a sub-system, classify samples indicating "abnormal" behavior if the abnormal excursion can be labeled, and diagnose and correct the "abnormal" behavior if information on the root cause and solution are available. Embodiments of the present invention are extensible in that additionally identified excursions may be added to the system.

An RBF function can be defined as any function that satisfies the following equation:

$$\emptyset(x)=\emptyset(\|x\|) \qquad \text{Equation 1}$$

Figure 4:
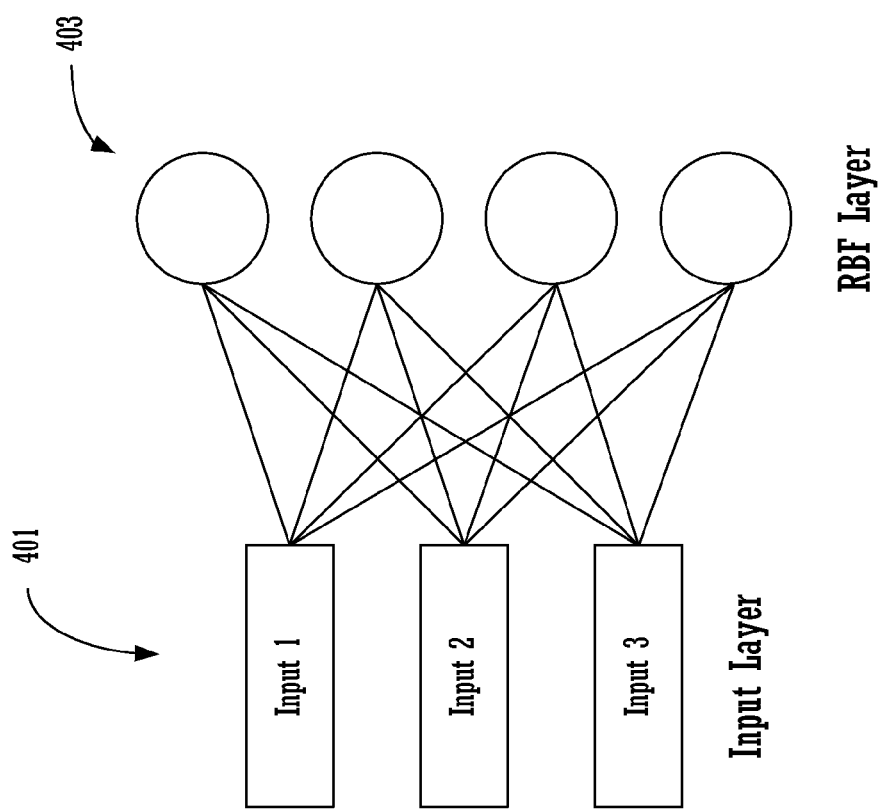
FIG. 4 illustrates an exemplary RBF network.

An RBF network is a collection of RBF functions located in n-dimensional space. In one RBF network shown in FIG. 4, there are two layers, including an input layer 401 and an RBF layer 403. This network has 3 inputs and 4 RBF nodes. Here, each node is located in n-dimensional space, where the number of inputs defines n (e.g., n=3 in FIG. 4). Each node can be defined using an n-element vector, and the input to each node may also be an n-element vector. The network shown in FIG. 4 is capable of distinguishing 5 unique excursions or classes. Each node represents a unique excursion or class. Unknown samples can belong to either nodes 1 through 4 or no node.

For example, an input sample may be a standardized value where the sample is expressed as a sigma difference between a known reference set, a specified number of runs in a process, or all runs from a specified number of days, which should provide greater than 90% accuracy.

Figure 6:
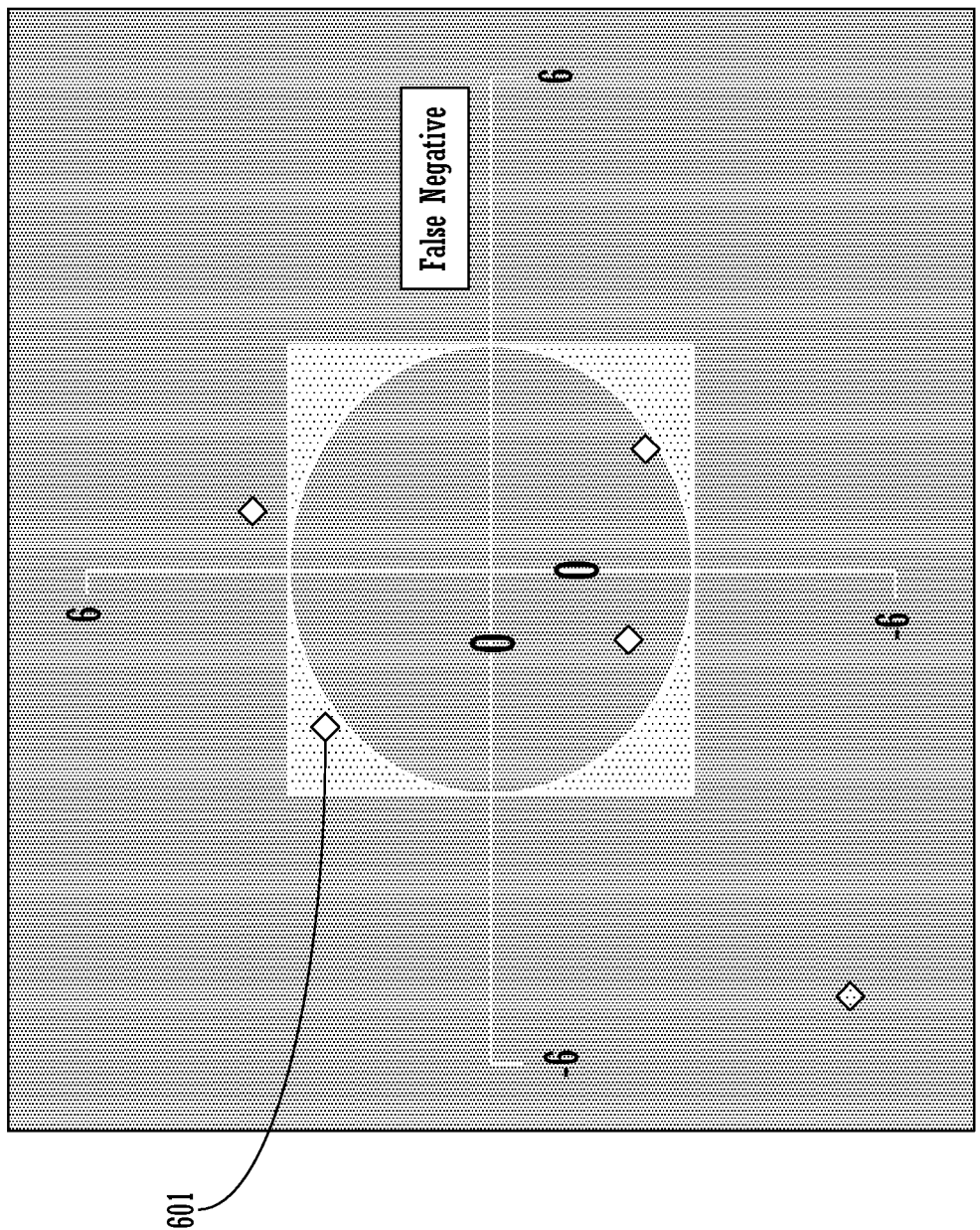
FIG. 6 illustrates false negative results for an RBF network.

However, errors increase with increasing dimensions in RBF networks. For example, for one-dimensional normally distributed data, 99.7% of the samples are expected to reside within +/−3σ. For two-dimensional normally distributed data, more samples fall outside +/−3σ. For three-dimensional normally distributed data, even more samples fall outside +/−3σ. As the dimensions increase, the volume of a unit hyper-sphere tends towards zero, thus leading to an increasing number of errors. Therefore, as shown in FIG. 6, a native RBF network will have false negative errors, where a sample 601 is identified as abnormal when the sample is normal. Here, sample 601 is outside the RBF function circle, but inside the +/−3 σ boundary. Therefore, a native RBF network indicates the sample 601 is outside the node (normal in this case) when the sample 601 is actually normal since it is within the +/−3 sigma boundary.

Figure 7:
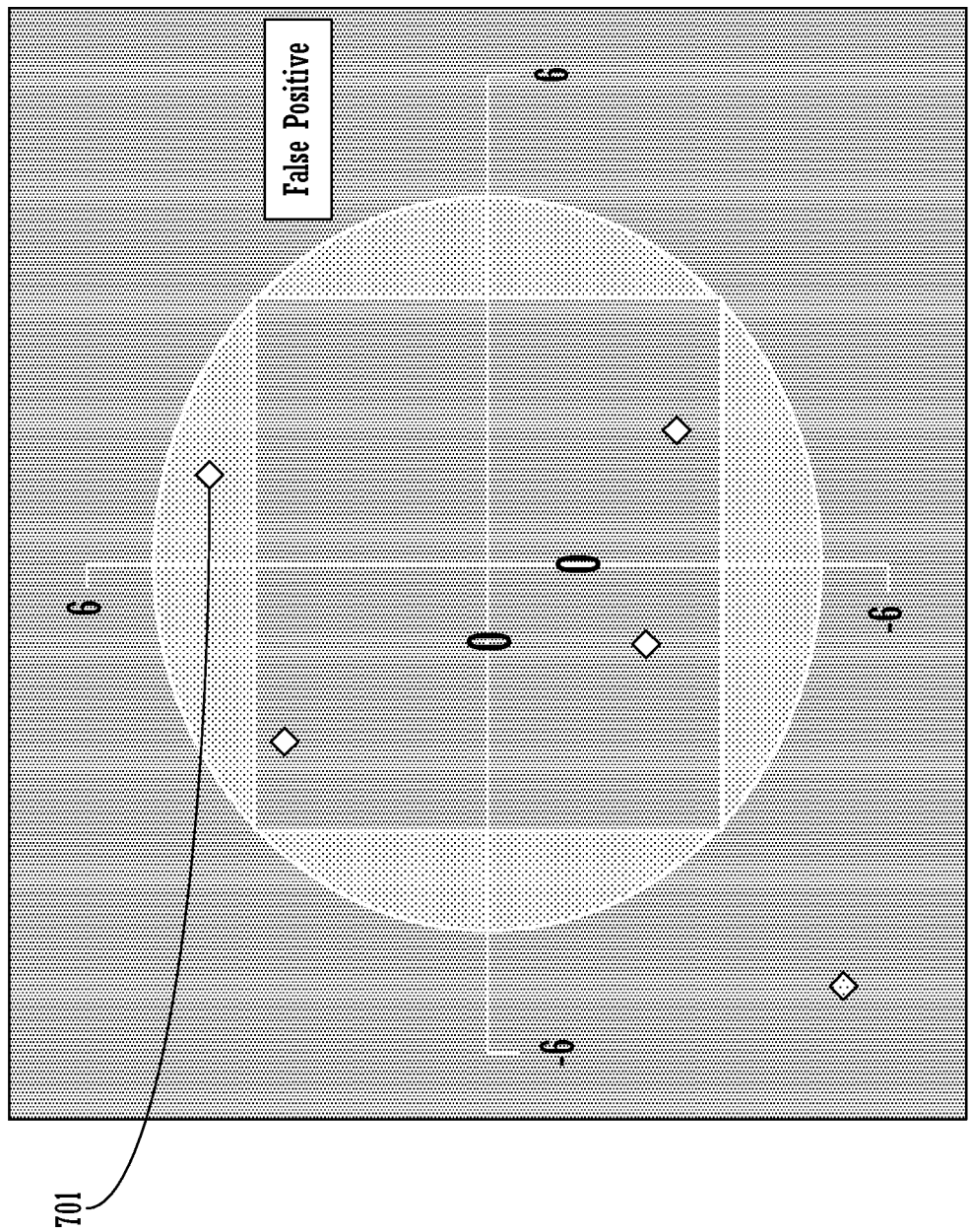
FIG. 7 illustrates false positive results for an RBF network.

In one embodiment, this issue is overcome by increasing the radii of the node hyper-spheres. There is still an error, but it is now, as shown in FIG. 7, a false positive where the sample 701 is identified as "normal" when the sample should be identified as unknown. These samples may be assigned a lower confidence estimation for the determined sample class.

Here, a node is created, and a hyper-cube is determined for the node. Then, the system determines whether a sample resides within the hyper-cube. If the sample does not reside within the hyper-cube, the system determines whether the sample resides within a hyper-sphere that has a radius equal to a diagonal of the hyper-cube. The system then determines a likely sample class, e.g., normal or abnormal, based on whether the sample resides within the hyper-cube (normal), hyper-sphere (normal with lower confidence) or neither (abnormal).

In one embodiment, the maximum error for any given node is along a single axis and can be computed for evaluation regarding of whether the network and error are tolerable. In one embodiment, the error can be minimized by adding additional nodes (e.g., excursions) on the axes with relevant labels.

Figure 1:
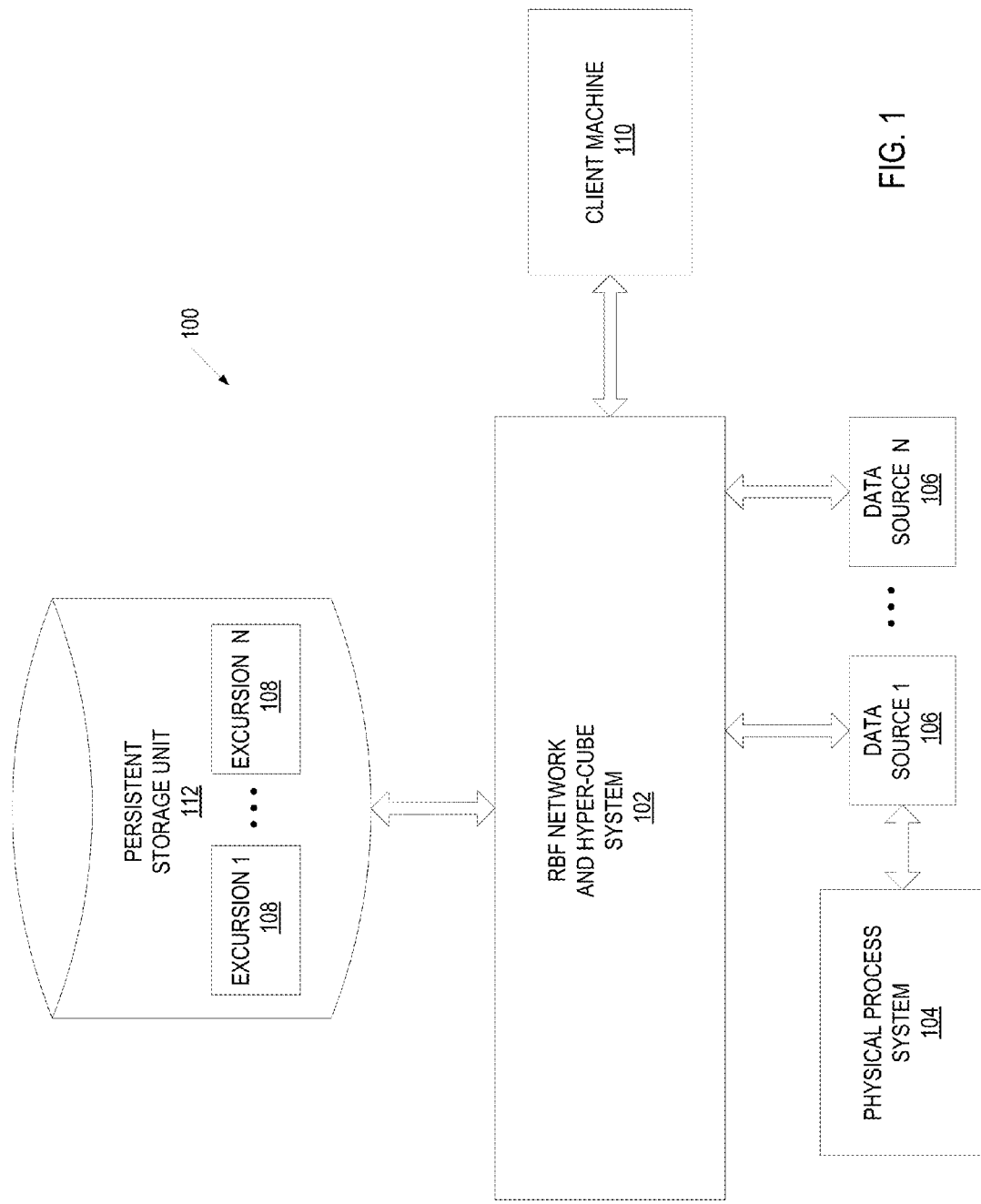
FIG. 1 illustrates one embodiment of a network architecture.
Figure 5:
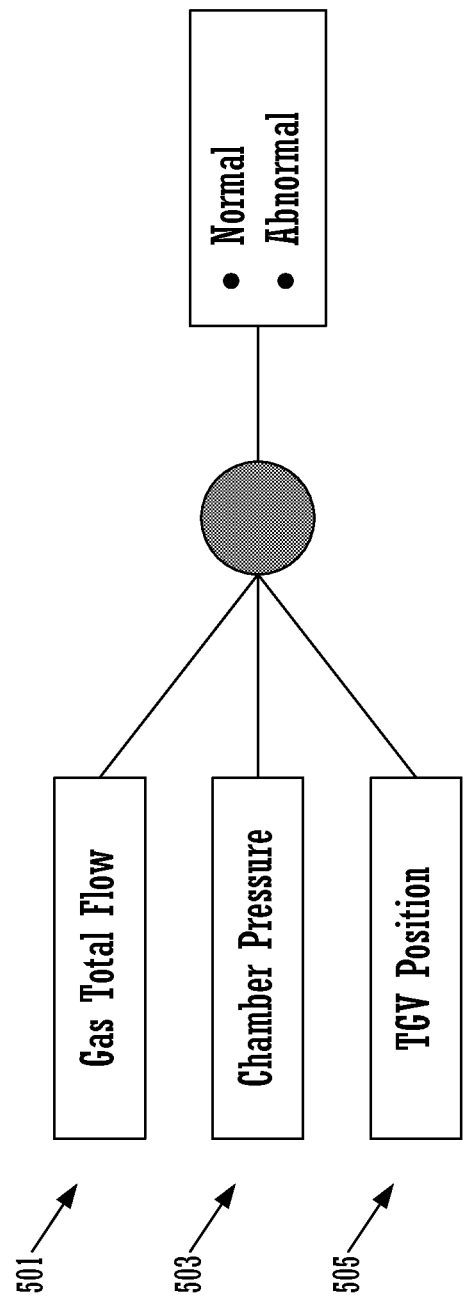
FIG. 5 illustrates an exemplary RBF network for semi-conductor processing equipment.

FIG. 1 illustrates a network architecture 100 according to one embodiment. Initially, an RBF network and hyper-cube system 102 identifies data sources 106 (e.g., sensors) that define a system, such as a physical process system 104. A user may select, e.g., via a graphical user interface (GUI) data (e.g., samples) from various ones of the data sources 106 via a client machine 110. The system 102 derives an RBF network and hyper-cubes from this data. For example, as shown in the RBF network of FIG. 5, sensor data for gas total flow 501, chamber pressure 503, and TGV position 505 could be used to characterize a pressure control system.

In an embodiment, a user may also select excursions 108 (i.e., defined parameters of abnormal system behavior) via the client machine 110, and the excursions 108 may be stored in a persistent storage unit 112 by the system 102.

For example, the physical process system 104 could include manufacturing tools or be connected to manufacturing tools directly or via a network (e.g., a local area network (LAN)). Examples of manufacturing tools include semiconductor manufacturing tools, such as etchers, chemical vapor deposition furnaces, etc, for the manufacture of electronic devices. Manufacturing such devices may include dozens of manufacturing steps involving different types of manufacturing processes, which may be known as a recipe.

The physical process system 104 can include any type of computing device, including desktop computers, laptop computers, handheld computers or similar computing devices, to control the system. Data sources 106, such as sensors, may be part of the physical process system 104 and/or the manufacturing tools or may be connected to the physical process system 104 and/or the manufacturing tools (e.g., via a network).

In another example, client machines 110 can be any type of computing device including desktop computers, laptop computers, mobile communications devices, cell phone, smart phones, handheld computers or similar computing devices.

In one embodiment, the physical process system 104, the data sources 106, the persistent storage unit 112, and the client machine 110 are connected to the system 102, which may be a direct connection or an indirect connection via a hardware interface (not shown), or via a network (not shown). The network can be a local area network (LAN), such as an intranet within a company, a wireless network, a mobile communications network, or a wide area network (WAN), such as the Internet or similar communication system. The network can include any number of networking and computing devices such as wired and wireless devices.

The division of functionality presented above is by way of example only. In other embodiments, the functionality described could be combined into a monolithic component or sub-divided into any combination of components. For example, the client machine 110 and the system 102 can be hosted on a single computer system, on separate computer systems, or on a combination thereof.

Figure 2:
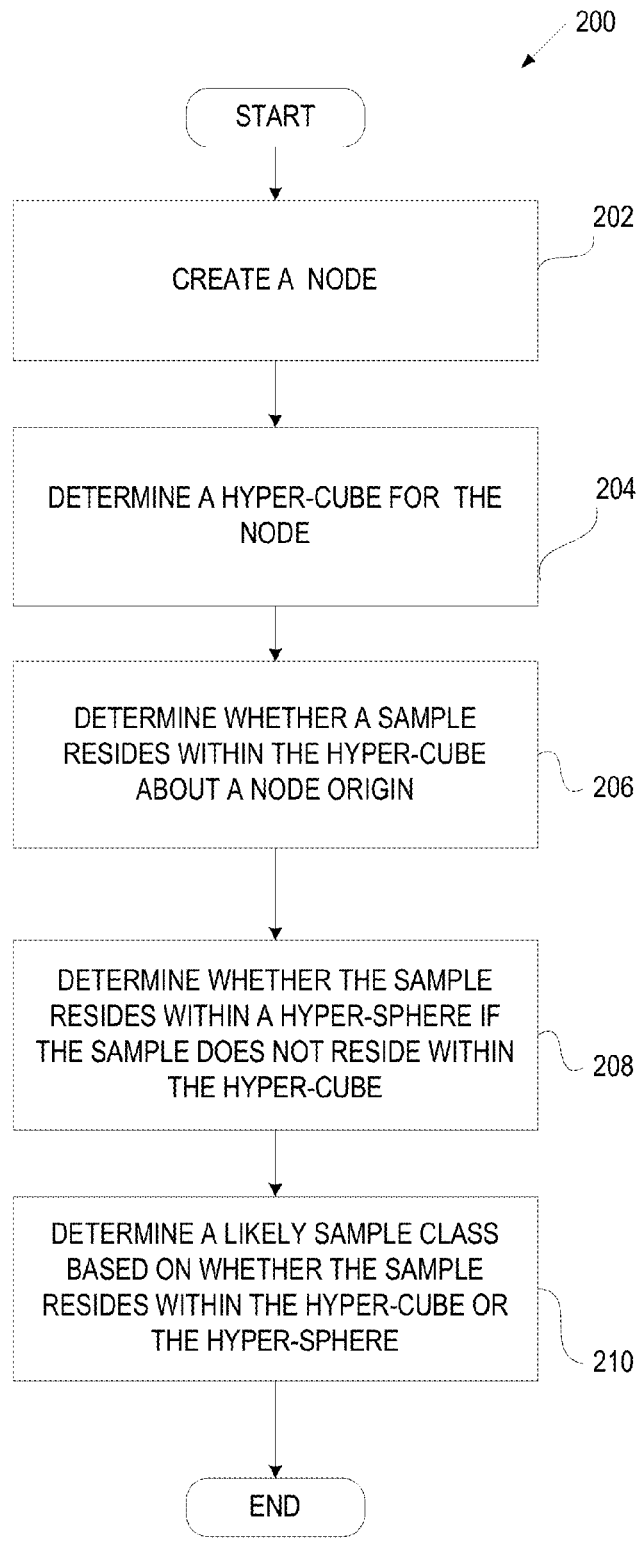
FIG. 2 illustrates one embodiment of a method for RBF network and hyper-cube analysis.

FIG. 2 illustrates one embodiment of a method 200 for RBF network and hyper-cube analysis. Method 200 can be performed by processing logic that can comprise hardware (e.g., circuitry, dedicated logic, programmable logic, microcode, etc.), software (e.g., instructions run on a processing device), or a combination thereof. In one embodiment, method 200 is performed by the system 102 of FIG. 1.

Figure 12:
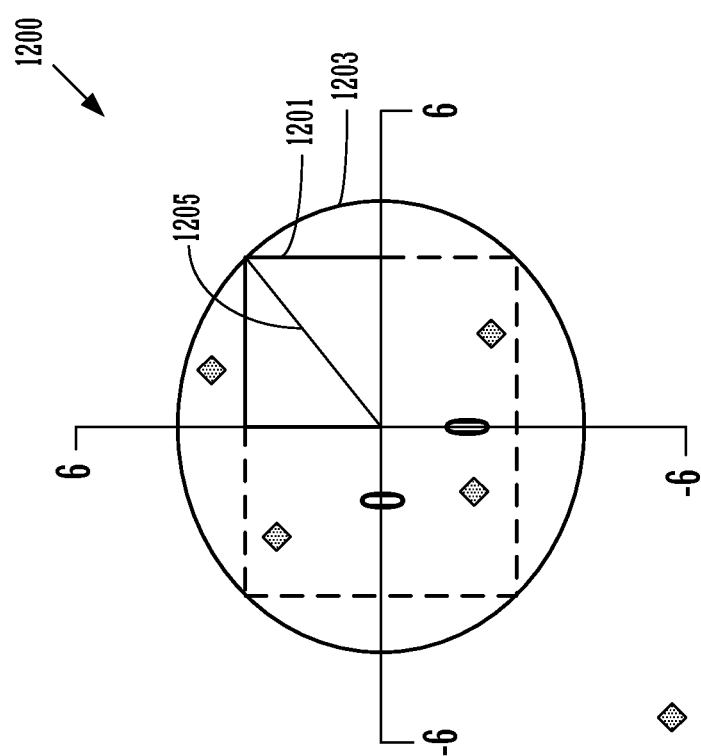
FIG. 12 illustrates an embodiment of creation of a hyper-cube and a hyper-sphere.

At block 202 of FIG. 2, processing logic of the system 102 creates a first node 1200, as shown in FIG. 12. The first node has multiple inputs and 1 output. To create a node, a number of inputs n, a location L[n] (the L[n] vector determines the node location in n-dimensional space), and a receptive field r (the dimension or size of the node) are provided. In an embodiment, a default r value is 1.

Each node contains a Gaussian activation:

$$x = e^{\left(\frac{-d^2}{2r^2}\right)} \qquad \text{eqn a1}$$

and a normalized Gaussian activation:

$$x = e^{\left(\frac{-\|d\|}{2r^2}\right)} \qquad \text{eqn a2}$$

The activation function used depends on the operation. In both cases $$d = \left(\sum_{m=1}^{n} |i_m - l_m|^2\right)^{1/2},$$

where I is the input vector

To activate a node, the input vector and the activation function to use are provided. The system 102 computes d and uses the appropriate activation function to return x.

A node threshold for any given value x, is the value used to determine if a given input I is contained within the node. The following is used to compute the node threshold:

$$\text{radius} = \sqrt{n} \cdot x \qquad \text{eqn a3}$$

$$nodeThreshold = e^{\left(\frac{-radius^2}{2}\right)}$$

The system 102 creates the first node with the appropriate locations and receptive fields, and activates the node with the correct activation function when appropriate.

When a node is created, along with the required node information, the system 102 also needs to record the node label and any associated actions. Node labels define the sample class, for example, normal or a defect. Node actions define what to do when a sample belongs to a particular node and when to perform the action.

At block 204, processing logic of the system 102 determines a first hyper-cube 1201 for the first node 1200, as shown in FIG. 12. In one embodiment, a 3-sigma hyper-cube is created based on reference data. In other words, the size of the first hyper-cube is 3 sigma.

At block 206, processing logic of the system 102 determines whether a sample resides within the first hyper-cube, when mirrored about the origin of the first node. The following is computed:

$$c[x] = \|i[x] - l[x]\| \text{ for } x=1 \text{ to } n$$

When a hyper-cube is used for detection, the output for any node will be either 0 or 1, where 1 indicates residence in the hyper-cube. If the c[x] values is less than or equal to r (i.e., receptive field) for the first node, the first node output is 1. In this case, the system 102 has used the first hyper-cube to detect what class the sample belongs to and the RBF functions are not activated. As shown with first node 800 of FIG. 8, if a sample 805 falls within a first hyper-cube 801, then the sample 805 is deemed to belong to a class of the first node and is considered normal.

Figure 8:
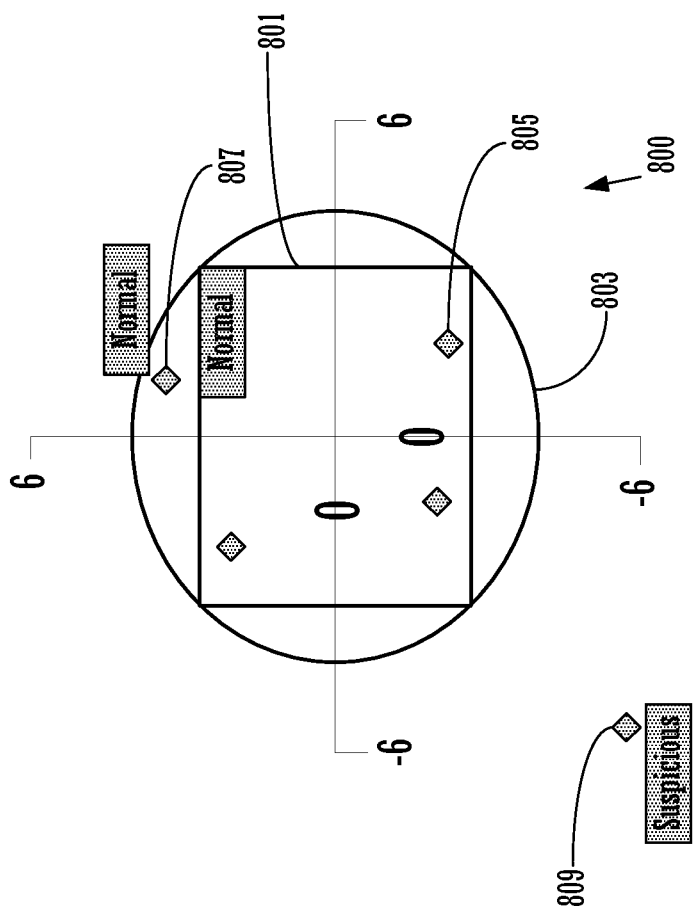
FIG. 8 illustrates an embodiment of an RBF network and hyper-cube analysis.

At block 208, if a sample is outside the first hyper-cube, then the system determines whether the sample resides within a first hyper-sphere 1203 about the first hyper-cube 1201 with a radius equal to a diagonal 1205 of the first hyper-cube 1201, as shown in FIG. 12. As shown in FIG. 8, if the sample 807 resides within a first hyper-sphere 803, then it is deemed to belong to the class of the first node 800 and is considered normal, but with a lower confidence estimation. If the sample 809 is outside the first hyper-sphere 803, then the sample is classified as unknown or suspicious.

For example, if the c[x] value is greater than r, then the system 102 switches to the RBF functions. Initially, the receptive field for all nodes present is set to 1. Here, a threshold adjustment scheme (i.e., using a fixed function but selecting a different threshold based on distance from the origin) is used instead of a receptive field adjustment scheme (i.e., using a function that is wider). The node is activated using eqn a1, and the output recorded, where output for each node ranges from 1 to 0 in value.

In other words, for a two dimensional case, two Gaussian type curves are the RBF function with receptive field 1. Here, the square (two-dimensional hyper-cube) has a 3 sigma side, such that a circle (two-dimensional hyper-sphere) about the square has a radius of 4.24. When input is provide and the RBF function is activated using eqn a1, the output is a value from 1 to 0, depending on how far the sample is from the node. The threshold is the RBF output where the input is the radius of the hyper-cube, in this case 4.24 is input to eqn a1. Here, the threshold is 0.00012.

In this example, if the sample had coordinates of (2,0), then the sample would be in the 3 sigma square. If the sample had coordinates of (3.5, 0), then the sample would be outside the square so eqn a1 would be activated. In this case, the output would be a value greater than the threshold so, the sample would be in the circle. If the sample had coordinates of (4.2,0), then again eqn a1 would be activated. However, now the output is less than the threshold so this sample is outside the circle.

At block 210, processing logic of the system 200 determines a likely sample class for the sample based on whether the sample resides within the hyper-cube or the hypersphere. If a hyper-cube was used for detection, the sample is deemed to belong to the first node if there is an output of 1. If RBF functions were used for detection, a node threshold is computed for the first node using eqn a3, where x is the original receptive field value for the current node. If the node output is greater than or equal to node threshold, then the sample is deemed to belong to this node.

A node error for any given value x is an approximation of how far the sample is from a theoretical hyper-cube plane with side x. The node error is used to determine a confidence estimation of a correct assignment of a sample to a node if the sample is outside the hyper-cube, but inside the hyper-sphere. The confidence estimation is based on how far the sample is from the side of the hyper-cube. The following equations are used to compute the node error.

$$\text{radius} = \sqrt{n} \cdot x \quad \text{eqn a4}$$

$$\text{error} = \sum_{m=1}^{n} \|i_m - l_m\| - x,$$

$$\text{where } \|i_m - l_m\| > x$$

$$\text{nodeError} = 1 - \frac{\text{error}}{\text{radius} - x}$$

Typically, the node error is rounded to 2 significant digits.

Figure 18:
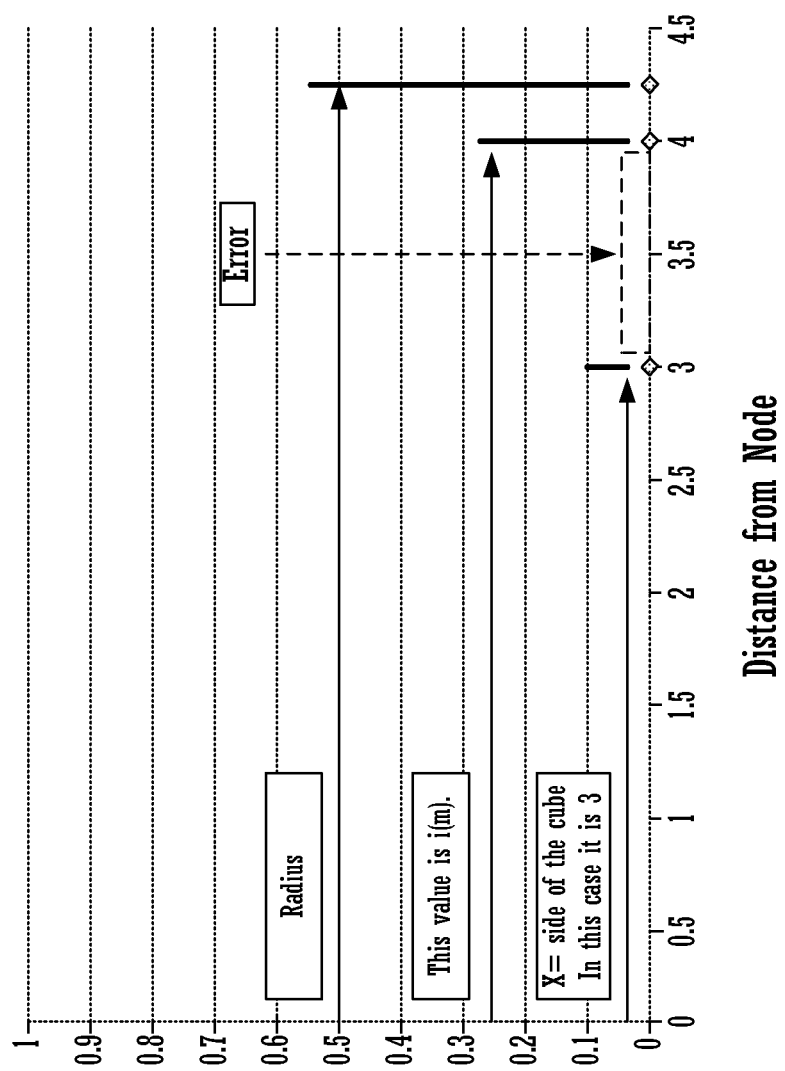
FIG. 18 illustrates an embodiment of confidence estimation.

In other words, the error can be described in one dimension. The term $i_m$ is the input and the term $l_m$ accounts for nodes that are away from the origin. In example, illustrated in FIG. 18, where the node is at the origin ($l_m$ is 0), x (i.e., the length of the side of the hyper-cube) is 3 sigma, the radius is 4.24, and $i_m$ is 4. Here, the error is abs(4−3), which is 1. The nodeError is (1−(1/4.24−3))) equals 0.19, which indicates that the sample is not close to the cube so there is a lower confidence that the sample belongs to this node. However, the preceding values represent one example, and $i_m$ is not limited to any particular value. If $I_m$ is greater than 4.24, then the nodeError is 0, which indicates that the sample is outside of the hyper-cube and the hyper-sphere.

Figure 3:
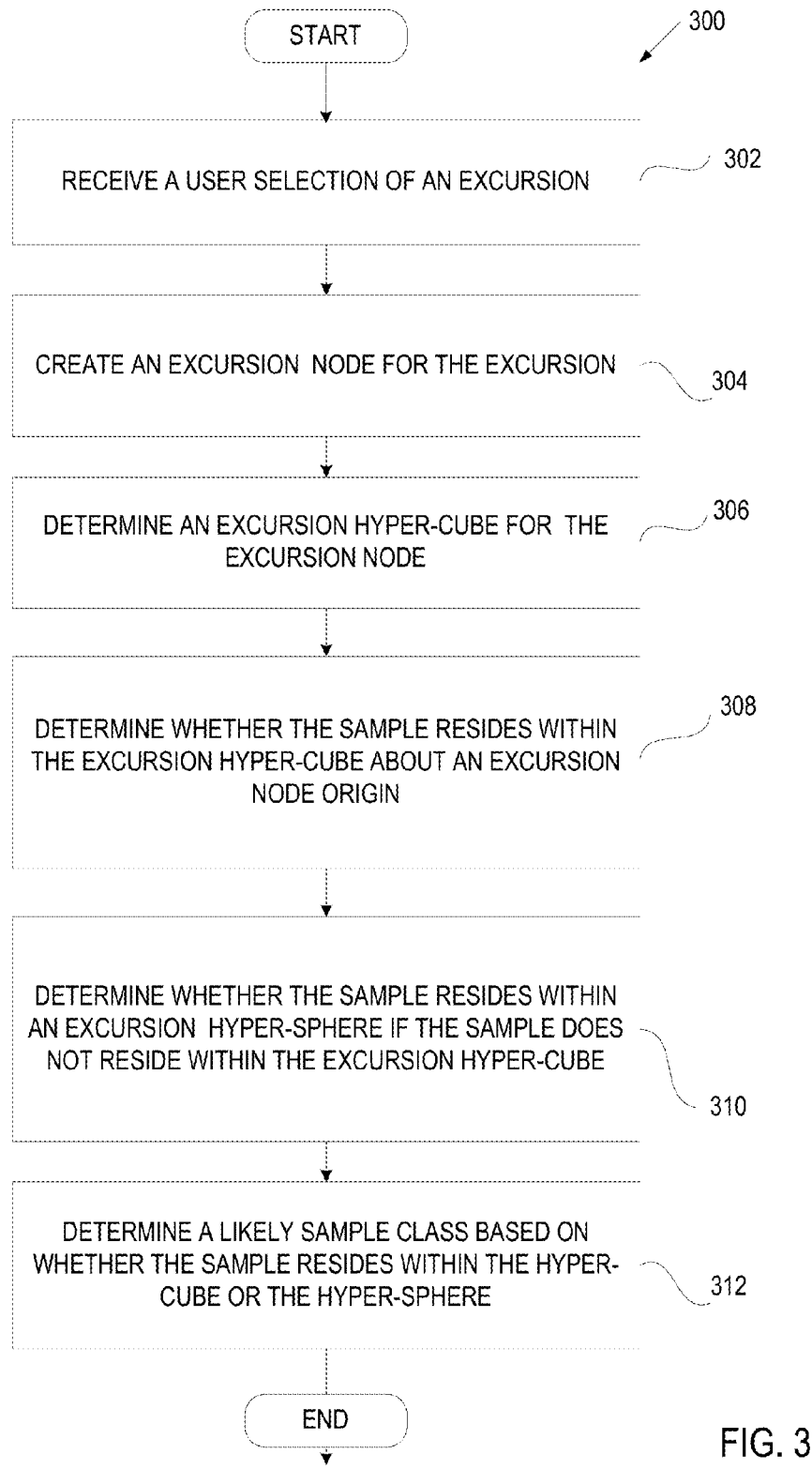
FIG. 3 illustrates another embodiment of a method for RBF network and hyper-cube analysis.

FIG. 3 illustrates one embodiment of a method 300 for RBF network and hyper-cube analysis. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the system 102 of FIG. 1.

At block 302, processing logic of the system 102 receives a user selection of an excursion from the client machine 110. For example, for any sample that resides outside the first hyper-sphere, the user can label this excursion with a descriptive label, e.g., Excursion A. The system 102 may store an excursion 108 in the persistent storage unit 112.

Figure 9:
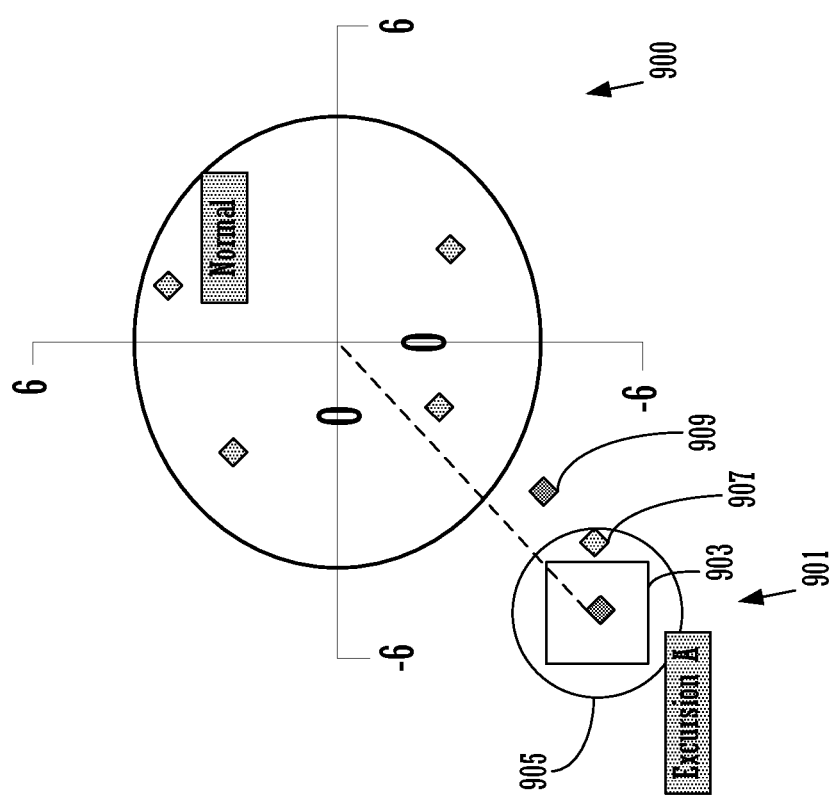
FIG. 9 illustrates an embodiment of an excursion in an RBF network and hyper-cube analysis.

At block 304, processing logic of the system 102 creates an excursion node. As shown in FIG. 9, an excursion A node 901 has been created in addition to first node 900. The excursion node may be created similarly to the first node as described with respect to block 202 of FIG. 2.

At block 306, processing logic of the system 102 determines an excursion hyper-cube 903 for the excursion node 901, as shown in FIG. 9. The excursion hyper-cube may be created similarly to the first hypercube as described with respect to block 204 of FIG. 2.

At block 308, processing logic of the system 102 determines whether a sample resides within the excursion hyper-cube 903, when mirrored about the origin of the excursion node 901, as shown in FIG. 9. If a sample resides within the excursion hyper-cube 903, then the sample is deemed to belong to the Excursion A node. The system 102 may determine whether a sample resides within the excursion hyper-cube similarly to the determination described with respect to block 206 of FIG. 2.

At block 310, if a sample is outside the excursion hyper-cube 903, then the system 102 determines whether the sample resides within an excursion hyper-sphere 905 about the excursion hyper-cube 903 with a radius equal to a diagonal of the excursion hyper-cube 903. If the sample 907 resides within the excursion hyper-sphere 905, then the sample 907 is deemed to belong to that the Excursion A node, but with a lower confidence estimation. If the sample 909 is outside the excursion hyper-sphere 905, then the sample 909 is classed as unknown. The system 102 may determine whether a sample resides within the excursion hyper-sphere similarly to the determination described with respect to block 208 of FIG. 2.

Figure 10:
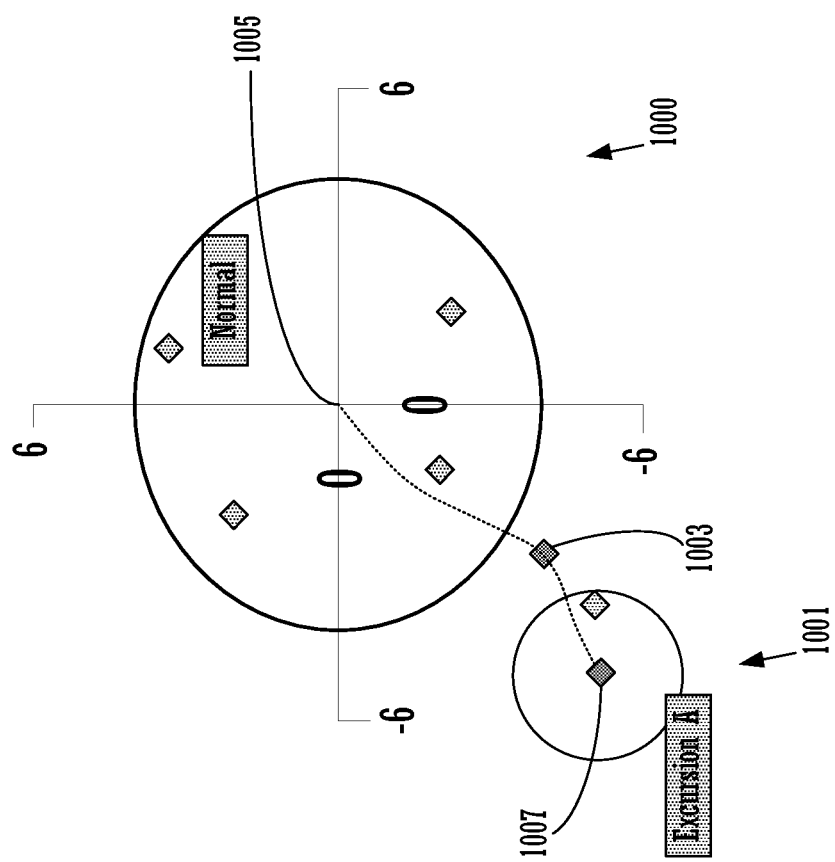
FIG. 10 illustrates an embodiment of an excursion in an RBF network and hyper-cube analysis.

In one embodiment, as shown in FIG. 10, for any sample 1003 that resides outside all hyper-spheres, the system 102 may predict which node the sample 1003 should be associated with, if any. Here, the RBF functions measure the distance between the sample 1003 and a centroid 1005, 1007 of each node 1000, 1001. The sample 1003 may then be deemed to belong to the closest centroid 1007 of Excursion A node 1001, as shown in FIG. 10. Here, the system 102 may allow the user to add the sample to the best fit class, add the sample to a new class, or take no action.

For example, each node is activated using normalized Gaussian activation eqn a2. Then, each node output is adjusted using the following.

$$NodeSum = \sum NodeOutput(n)$$
$$NodeOutput(n) = \frac{NodeOutput(n)}{NodeSum}$$

This scheme ensures that one node is activated, so that the output is not 'unknown'. The logic for determining the sample class is similar. In other words, assuming that an initial network found a sample to 'unknown' (meaning it did not belong to any existing nodes), a user may want to determine whether the sample resembles an existing node (e.g., near an existing node, but not actually in it). Here, the network is activated using the normalized Gaussian activation, and at least one node activates such that the network does not return 'unknown' for a sample. The network will return a node label for the node that is closest to the sample.

Figure 11:
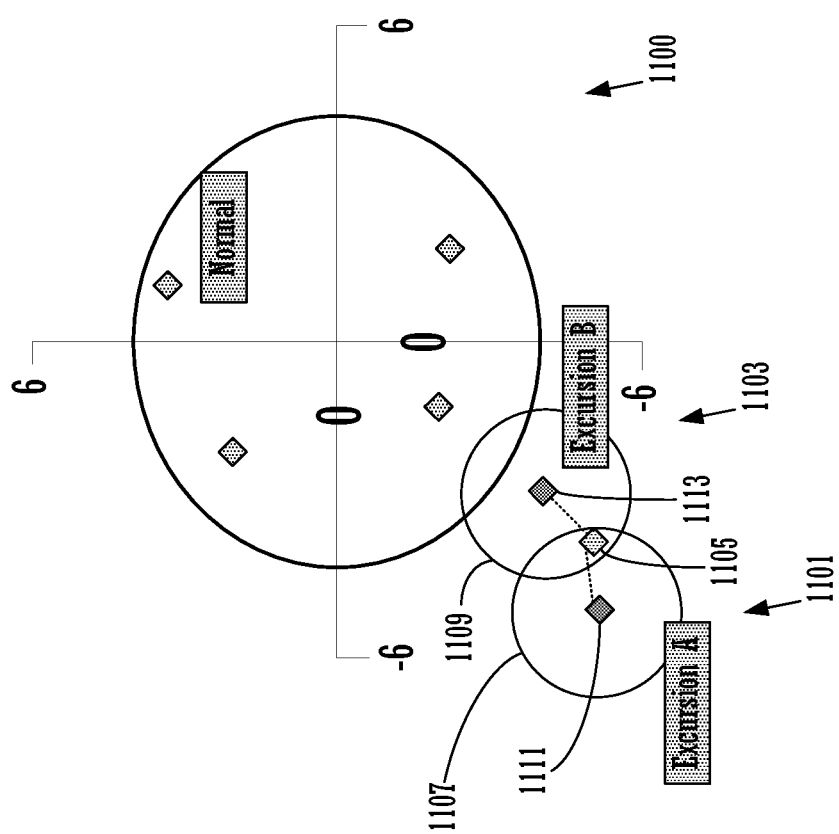
FIG. 11 illustrates an embodiment of excursions in an RBF network and hyper-cube analysis.

In one embodiment, if a sample resides in multiple hyper-spheres or hyper-cubes, the system 102 may use RBF functions to determine the hyper-sphere or hyper-cube to which the sample belongs. For example, FIG. 11 shows a first node 1100, excursion A node 1101, and excursion B node 1103. Here, sample 1105 resides within the hyper-spheres 1107, 1109 of both excursion A node 1101 and excursion B node 1103. The distances between the sample 1105 and the centroids 1111, 1113 of each node 1101, 1103 the sample resides in are measured. The system 102 then deems the sample 1105 to belong to the node whose centroid is closest.

In one embodiment, if hyper-cubes were used for detection and the sample resides in 2 or more hyper-cubes (e.g., multiple nodes have an output value of 1), the receptive field for all nodes present is set to 1. The nodes of the hyper-cubes the sample resides in are activated using eqn a1, and the output is recorded. The maximum output is recorded, and the sample is deemed to belong to the node with the maximum output. If RBF functions were used and the sample is found in 2 or more nodes, the maximum output is recorded, and the sample is deemed to belong to the node with the maximum output. Here, the sample can belong to either no nodes or only 1 node. The sample is given the label of the node where the sample resides.

In other words, if the sample is found in two or more hyper-cubes, the hyper-cube detection only returns 1 or 0, so the cube that the sample belongs to cannot be determined with this information alone. Therefore, switching to RBF functions, the distance of the sample from each cube center can be determined. An unknown sample is labeled with the label of the closest cube. If the sample is found in 2 or more hyper-spheres, the label of the node with the largest RBF function output is recorded, since the RBF function returns 1 if it is at the center of the cube and decays away as samples are further from the center.

In determining a confidence estimation for detection, if hyper-cubes were used for detection, the certainty is 100%. If RBF functions were used and the sample was found to not belong to any node, then the certainty is again 100%. Otherwise the certainty is given by eqn a4*100%, where x is the original receptive field value for that node.

Figure 13:
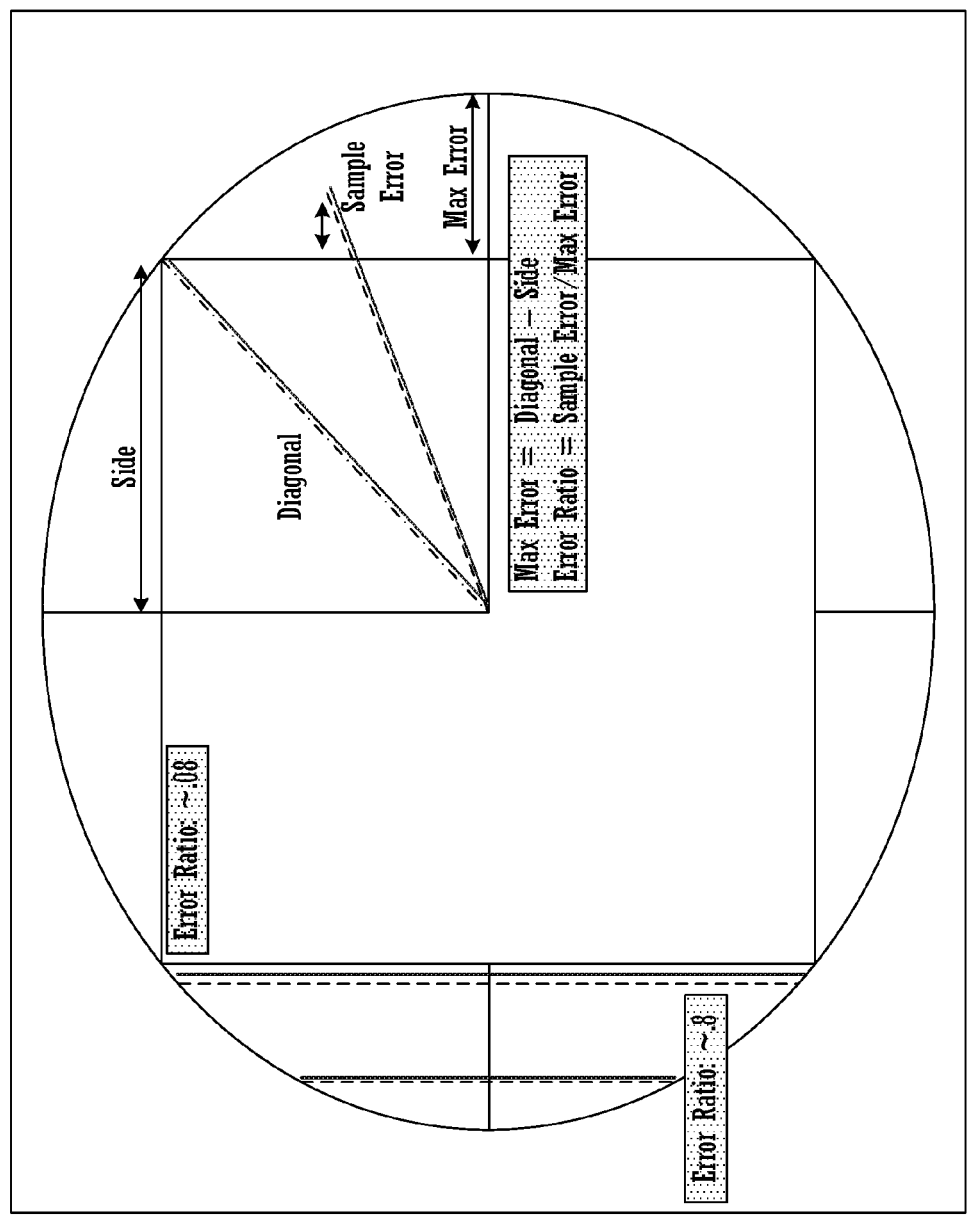
FIG. 13 illustrates an embodiment of confidence estimation.

In one embodiment, the system 102 determines a confidence estimation for a sample that resides within a hyper-sphere but outside a hyper-cube. Here, a sample may only have an error in one dimension. The system 102 determines a maximum error in any dimension and a sample error on a single error dimension, as shown in FIG. 13. The distance to a plane of the hyper-cube is determined by an error ratio of the sample error to the maximum error. This error ratio may be used to determine the confidence estimation.

FIGS. 14A, 14B, 14C, 14D, and 14E illustrate exemplary sensor data that may be analyzed by the according to the methods described above. For example, the sensor data may characterize an Bias RF System, including Match Series Position (shown in FIG. 14A), Match Shunt Position (shown in FIG. 14B), DC Bias (shown in FIG. 14C), Forward Power (shown in FIG. 14D), and Reflected Power (shown in FIG. 14E). In these examples, samples within the center band indicate 'normal' behavior. Here, a five-dimensional RBF network may be created that takes the 5 sets of sensor data as input and can initially only discriminate 'normal' versus 'not normal' operation.

FIG. 15A shows an example of 'normal' operation, and FIG. 15B shows an example of 'not normal' operation. For the 'not normal' case of FIG. 15B, Match Series Position is UP, Match Shunt Position is DOWN, DC Bias is DOWN, Forward Power is UP, and Reflected Power is UP. Here, the system may allow the user to designate this excursion as a 'known' excursion type (e.g., failure type) with a corrective action if known, or take no action.

For this example, the user determined that this was a failure called 'RF Bias Issue with the corrective action as 'upgrading the SW to version xx.xx.xx'. In an embodiment, this information may be added to as an excursion 108 to the persistent storage unit 112, so when the system 102 analyzes a sample with similar parameters, the system 102 may provide the user with the failure type and recommended corrective action.

Figure 16:
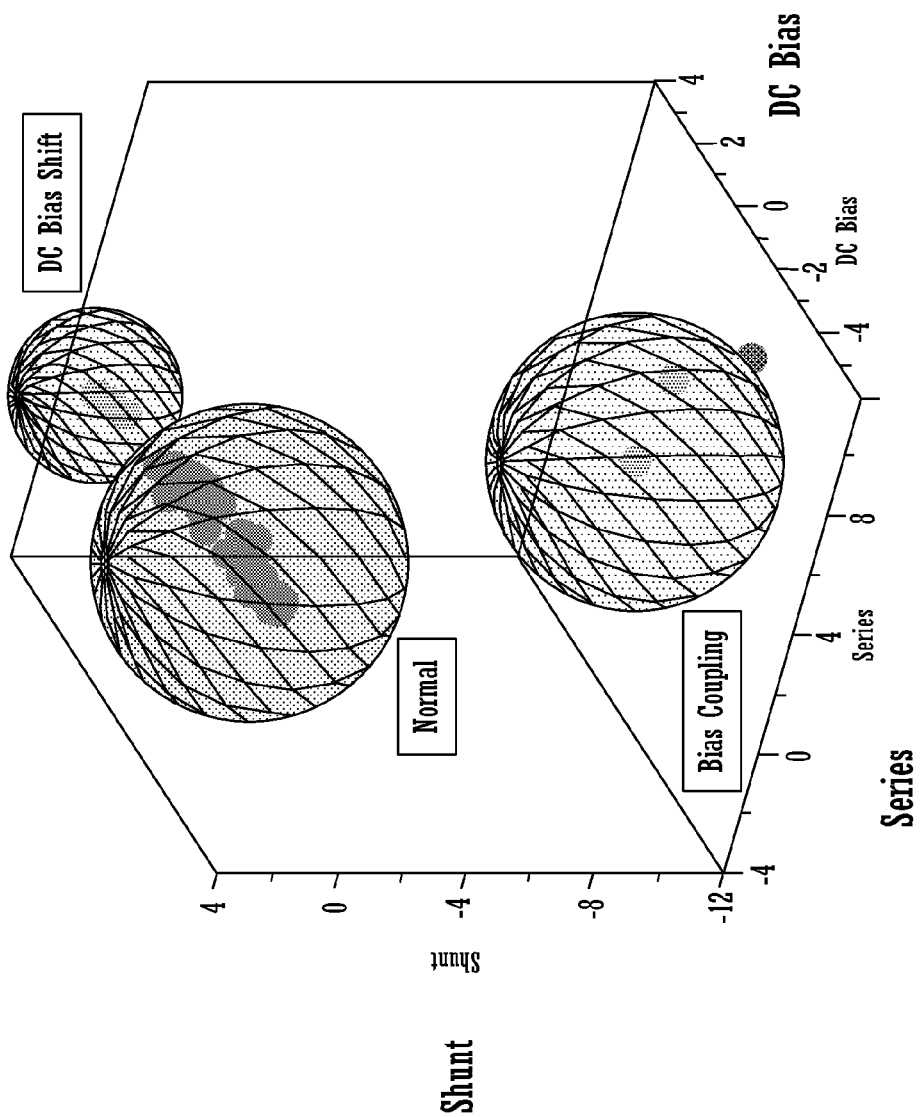
FIG. 16 illustrates an exemplary RBF network.

FIG. 16 shows an example of an RBF network where only 3 dimensions are shown. Here, the DC Bias and Normal nodes overlap. In this case, the system will determine that a sample is 'Normal' if the analyzed sample is in both 'Normal' & 'DC Bias Shift' nodes. A sample is shown on the border of the 'Bias Coupling' node, and the certainty was determined to be about 78%.

In an embodiment, if new excursion nodes are added, the node size is determined by the distance from the origin of the first node. The first node is located at the origin. The further the excursion node is from the origin, the larger the node size. Initially the distance between the sample and the origin is computed using:

$$distance = \left( \sum_{m=1}^{n} |s_m - o_m|^2 \right)^{\frac{1}{2}}$$

where s is the sample coordinates, 0 is the origin, n is the dimensions

If distance is less than 3, then new node size is 1. If distance is greater than 9, then new node size is 3. Otherwise, new node size=distance/3. In other words, the further away the node is from the origin, the larger the node will be. The node size increases linearly from a node size of 1 close to the origin, until the node size is 3, and nodes further away than this will have a node size of 3. Here, close to the origin, the excursion is likely to have a localized distribution, and, hence, a small node is used such that the node does not overlap the 'normal' node. Further from the origin, the distribution increases, so a bigger node is used. However, a maximum node size of 3 can be set so that the nodes do not get unreasonably large.

Figure 17:
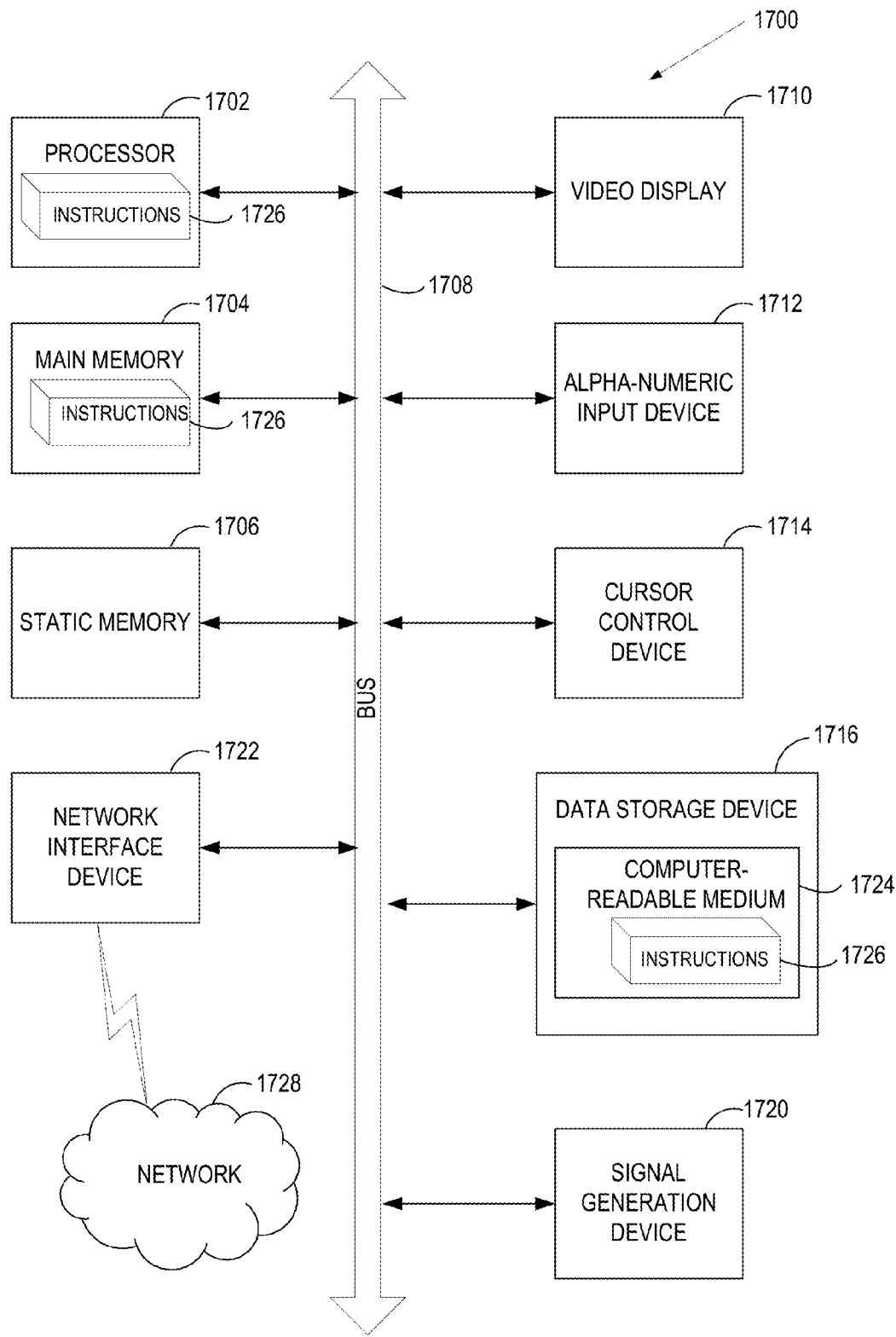
FIG. 17 illustrates an exemplary computer system.

FIG. 17 is a block diagram illustrating an exemplary computing device (or system) 1700. The computing device 1700 includes a set of instructions for causing the computing device 1700 to perform any one or more of the methodologies discussed herein. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

The exemplary computer device 1700 includes a processing system (processing device) 1702, a main memory 1704 (e.g., read-only memory (ROM), flash memory, dynamic random access memory (DRAM) such as synchronous DRAM (SDRAM), etc.), a static memory 1706 (e.g., flash memory, static random access memory (SRAM), etc.), and a data storage device 1716, which communicate with each other via a bus 1708.

Processing device 1702 represents one or more general-purpose processing devices such as a microprocessor, central processing unit, or the like. More particularly, the processing device 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1702 may also be one or more special-purpose processing devices such as an application specific integrated circuit (ASIC), a field programmable gate array (FPGA), a digital signal processor (DSP), network processor, or the like. The processing device 1702 is configured to execute the system 102 of FIG. 1 for performing the operations and steps discussed herein.

The computing device 1700 may further include a network interface device 1722. The computing device 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1720 (e.g., a speaker).

The data storage device 1716 may include a computer-readable storage medium 1724 on which is stored one or more sets of instructions 1726 embodying any one or more of the methodologies or functions described herein. The instructions 1726 may also reside, completely or at least partially, within the main memory 1704 and/or within the processing device 1702 during execution thereof by the computing device 1700, the main memory 1704 and the processing device 1702 also constituting computer-readable media. The instructions 1726 may further be transmitted or received over a network 1728 via the network interface device 1722.

While the computer-readable storage medium 1724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "identifying", "comparing", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an system for performing the operations herein. This system can be specially constructed for the required purposes, or it can comprise a general-purpose computer selectively activated or reconfigured by a computer program stored in the computer. Such a computer program can be stored in a computer (or machine) readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, flash memory, or any type of media suitable for storing electronic instructions.

The algorithms and displays presented herein are not inherently related to any particular computer or other apparatus. Various general-purpose systems can be used with programs in accordance with the teachings herein, or it may prove convenient to construct a more specialized apparatus to perform the method steps. The structure for a variety of these systems will appear from the description herein. In addition, embodiments of the present invention are not described with reference to any particular programming language. It will be appreciated that a variety of programming languages can be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising
    creating, by a processor, a first node;
    determining, by the processor, a first hyper-cube for the first node;
    determining, by the processor, whether a sample resides within the first hyper-cube; and
    if the sample does not reside within the first hyper-cube, determining, by the processor, whether the sample resides within a first hyper-sphere, wherein the first hyper-sphere has a radius equal to a diagonal of the first hyper-cube.

2. The method of claim 1 further comprising determining a likely sample class based on whether the sample resides within the first hyper-cube or the first hyper-sphere.

3. The method of claim 2 further comprising:
    receiving a user-selection of an excursion;
    creating an excursion node for the excursion;
    determining an excursion hyper-cube for the excursion node;
    determining whether the sample resides within the excursion hyper-cube about an excursion node origin;
    if the sample does not reside within the excursion hyper-cube, determining whether the sample resides within an excursion hyper-sphere, wherein the excursion hyper-sphere has a radius equal to a diagonal of the excursion hyper-cube; and
    determining, by the processor, a likely sample class based on whether the sample resides within the excursion hyper-cube or the excursion hyper-sphere.

4. The method of claim 3 further comprising recording an excursion label for the excursion.

5. The method of claim 3 further comprising determining whether the sample belongs to the first node or the excursion node if the sample is within both the first hyper-sphere and the excursion hyper-sphere.

6. The method of claim 2 further comprising determining a confidence estimation for the sample class.

7. The method of claim 1, wherein creating a first node comprises:
    receiving input vector;
    receiving activation function; and
    determining an activation value of the at least one node.

8. A system comprising:
    a memory; and
    a processing device coupled to the memory to:
        create a first node;
        determine a first hyper-cube for the first node;
        determine whether a sample resides within the first hyper-cube; and
        if the sample does not reside within the first hyper-cube, determine whether the sample resides within a first hyper-sphere, wherein the first hyper-sphere has a radius equal to a diagonal of the first hyper-cube.

9. The system of claim 8, wherein the processing device is further to determine a likely sample class based on whether the sample resides within the first hyper-cube or the first hyper-sphere.

10. The system of claim 9, wherein the processing device is further to:
    receive a user-selection of an excursion;
    create an excursion node for the excursion;
    determine an excursion hyper-cube for the excursion node;
    determine whether the sample resides within the excursion hyper-cube about an excursion node origin;
    if the sample does not reside within the excursion hyper-cube, determine whether the sample resides within an excursion hyper-sphere, wherein the excursion hyper-sphere has a radius equal to a diagonal of the excursion hyper-cube; and
    determine a likely sample class based on whether the sample resides within the excursion hyper-cube or the excursion hyper-sphere.

11. The system of claim 10, wherein the processing device is further to record an excursion label for the excursion.

12. The system of claim 10, wherein the processing device is further to determine whether the sample belongs to the first node or the excursion node if the sample is within both the first hyper-sphere and the excursion hyper-sphere.

13. The system of claim 9, wherein the processing device is further to determine a confidence estimation for the sample class.

14. The system of claim 8, wherein to create a first node, the processing device is to:
    receive input vector;
    receive activation function; and
    determine an activation value of the at least one node.

15. A non-transitory computer-readable storage medium including instructions that, when executed by a computer system, cause the computer system to perform a set of operations comprising:
    creating a first node;
    determining a first hyper-cube for the first node;
    determining whether a sample resides within the first hyper-cube; and
    if the sample does not reside within the first hyper-cube, determining whether the sample resides within a first hyper-sphere, wherein the first hyper-sphere has a radius equal to a diagonal of the first hyper-cube.

16. The non-transitory computer-readable storage medium of claim 15, wherein the operations further comprise determining a likely sample class based on whether the sample resides within the first hyper-cube or the first hyper-sphere.

17. The non-transitory computer-readable storage medium of claim 16, wherein the operations further comprise:
    receiving a user-selection of an excursion;
    creating an excursion node for the excursion;
    determining an excursion hyper-cube for the excursion node;
    determining whether the sample resides within the excursion hyper-cube about an excursion node origin;
    if the sample does not reside within the excursion hyper-cube, determining whether the sample resides within an excursion hyper-sphere, wherein the excursion hyper-sphere has a radius equal to a diagonal of the excursion hyper-cube; and
    determining a likely sample class based on whether the sample resides within the excursion hyper-cube or the excursion hyper-sphere.

18. The non-transitory computer-readable storage medium of claim 17, wherein the operations further comprise recording an excursion label for the excursion.

19. The non-transitory computer-readable storage medium of claim 17, wherein the operations further comprise determining whether the sample belongs to the first node or the excursion node if the sample is within both the first hyper-sphere and the excursion hyper-sphere.

20. The non-transitory computer-readable storage medium of claim 15, wherein creating a first node comprises:
   receiving input vector;
   receiving activation function; and
   determining an activation value of the at least one node.

* * * * *